US008953134B2

(12) United States Patent
Nomura et al.

(10) Patent No.: US 8,953,134 B2
(45) Date of Patent: Feb. 10, 2015

(54) LIQUID CRYSTAL DISPLAY PANEL

(75) Inventors: Shinichiro Nomura, Tottori (JP); Kimitaka Kamijo, Nagano (JP); Tae Nakahara, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 128 days.

(21) Appl. No.: 13/010,442

(22) Filed: Jan. 20, 2011

(65) Prior Publication Data
US 2012/0188496 A1 Jul. 26, 2012

(51) Int. Cl.
*G02F 1/1343* (2006.01)
*G02F 1/1337* (2006.01)

(52) U.S. Cl.
CPC .............. *G02F 1/134363* (2013.01); *G02F 2001/134372* (2013.01)
USPC ............................. 349/146; 349/129; 349/145

(58) Field of Classification Search
USPC .......................................... 349/141–146, 129
See application file for complete search history.

(56) References Cited

U.S. PATENT DOCUMENTS

| 6,466,288 B1 * | 10/2002 | Rho ............................... 349/141 |
| 6,469,765 B1 | 10/2002 | Matsuyama et al. |
| 6,784,964 B2 | 8/2004 | Nakayoshi et al. |
| 8,324,818 B2 * | 12/2012 | Kunimori et al. .............. 315/157 |
| 2002/0041354 A1 | 4/2002 | Noh et al. |
| 2005/0231676 A1 | 10/2005 | Lin et al. |
| 2007/0002251 A1 * | 1/2007 | Chang et al. .................... 349/141 |
| 2007/0024789 A1 | 2/2007 | Itou et al. |
| 2007/0035675 A1 | 2/2007 | Um et al. |
| 2007/0040978 A1 | 2/2007 | Nakayoshi et al. |
| 2007/0076157 A1 * | 4/2007 | Wang et al. .................... 349/143 |
| 2008/0151169 A1 | 6/2008 | Park et al. |
| 2008/0204639 A1 * | 8/2008 | Wada ............................. 349/114 |
| 2009/0323005 A1 * | 12/2009 | Ota ................................ 349/143 |
| 2010/0007835 A1 * | 1/2010 | Shimomaki ................... 349/138 |
| 2010/0026948 A1 * | 2/2010 | Wang et al. .................... 349/129 |
| 2010/0157228 A1 * | 6/2010 | Sakurai et al. ................ 349/141 |

FOREIGN PATENT DOCUMENTS

| JP | 2000-356786 | 12/2000 |
| JP | 2002-014374 | 1/2002 |
| JP | 2002-182230 | 6/2002 |

(Continued)

OTHER PUBLICATIONS

Japanese Office Action issued Dec. 7, 2012 in corresponding Japanese Patent Application No. 2008-177487.

*Primary Examiner* — Charles Chang
(74) *Attorney, Agent, or Firm* — K&L Gates LLP

(57) ABSTRACT

A liquid crystal display panel is provided and includes a pair of substrates facing each other with a liquid crystal layer therebetween. One of the substrates having, thereon, an upper electrode having a plurality of slits formed therein, a lower electrode facing the upper electrode with an insulating film therebetween and disposed so as to be adjacent to the substrate, and an alignment film formed so as to cover surfaces of the upper electrode and the insulating film. Each of the slits includes a linear portion disposed so as to be parallel to a liquid crystal alignment direction when no voltage is applied and two extension portions extending from both ends of the linear portion so that a distance between the two extension portions increases in a direction perpendicular to the linear portion while keeping a symmetrical shape with respect to the direction.

8 Claims, 4 Drawing Sheets

(56) References Cited

FOREIGN PATENT DOCUMENTS

| JP | 2003-195330 | 7/2003 |
| JP | 2003-322869 | 11/2003 |
| JP | 2007-034151 | 2/2007 |
| JP | 2007-047797 | 2/2007 |
| JP | 2007-264231 | 10/2007 |
| WO | 2005/006068 | 1/2005 |

* cited by examiner

10A

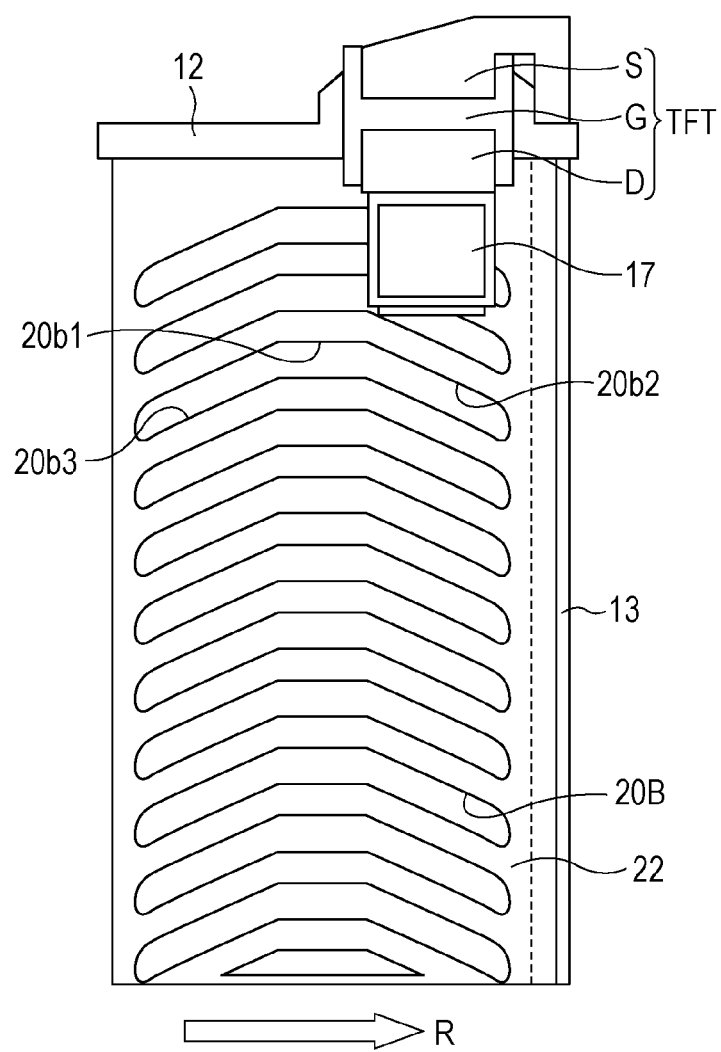

LIQUID CRYSTAL DISPLAY PANEL

CROSS REFERENCES TO RELATED APPLICATIONS

The present application contains subject matter related to that disclosed in Japanese Priority Patent Application JP 2008-177487 filed in the Japan Patent Office on Jul. 8, 2008, the entire contents of which are hereby incorporated by reference.

BACKGROUND

The present disclosure relates to a fringe field switching (FFS) mode liquid crystal display panel and, in particular, to an FFS mode liquid crystal display panel having a slit formed by combining two slit portions that extend in different directions.

Liquid crystal display panels have characteristics in that they have a lighter weight, a lower profile, and lower power consumption than cathode ray tubes (CRTs). Accordingly, liquid crystal display panels are used in many electronic apparatuses for a display purpose. In liquid crystal display panels, liquid crystal molecules are arranged in a predetermined direction by performing a rubbing process on an alignment film. By changing the directions of the liquid crystal molecules using an electric field, the light transmittance or reflectance is changed. Thus, an image can be displayed.

In order to apply an electric field to a liquid crystal layer of a liquid crystal display panel, a longitudinal electric field method or a transverse electric field method is used. In a liquid crystal display panel that uses a longitudinal electric field method, an electrical field in a substantially longitudinal direction is applied to the liquid crystal molecules using a pair of electrodes disposed with a liquid crystal layer therebetween. Examples of the liquid crystal display panel that uses a longitudinal electric field method include a twisted nematic (TN) mode liquid crystal display panel, a vertical alignment (VA) mode liquid crystal display panel, and a multi-domain vertical alignment (MVA) mode liquid crystal display panel. In contrast, in a liquid crystal display panel that uses a transverse electric field method, a pair of substrates are disposed with a liquid crystal layer therebetween. A pair of electrodes are disposed on the inner surface of one of the pair of substrates so as to be electrically insulated from one another. Thus, an electrical field in a substantially transverse direction is applied to the liquid crystal molecules. Examples of the liquid crystal display panel that uses a transverse electric field method include an in-plane switching (IPS) mode liquid crystal display panel in which the two electrodes do not overlap in plan view and an FFS mode liquid crystal display panel in which the two electrodes overlap in plan view.

In the FFS mode liquid crystal display panel among the various types of liquid crystal display panel, a pair of electrodes including an upper electrode and a lower electrode are disposed in different layers with an insulating film therebetween. The upper electrode includes a slit-like opening, and an electric field that passes through the slit in a substantially transverse direction is applied to the liquid crystal layer. The FFS mode liquid crystal display panel can advantageously provide a wide viewing angle and improved image contrast. Accordingly, in recent years, FFS mode liquid crystal display panels have been in widespread use.

In general, in liquid crystal display panels for color display, three sub-pixels R (red), G (green), and B (blue) are formed in a line, and a combination of the three sub-pixels form one pixel. In general, each pixel is substantially square. Accordingly, each of the sub-pixels has a vertically long rectangular shape. Therefore, in FFS mode liquid crystal display panels, since it is difficult to generate an electric field in a desired direction at both ends of the slit formed in the upper electrode, the direction in which the slit extends is made to be the longitudinal direction, as described in Japanese Unexamined Patent Application Publication Nos. 2002-014374 and 2003-322869. In this way, a decrease in the aperture ratio can be made small.

In addition, in FFS mode liquid crystal display panels, the slit extends so as to be at a slight angle with respect to the rubbing direction. Thus, the liquid crystal molecules can rotate in the same direction. For color liquid crystal display panels, a change in color caused by a change in viewing angle can be reduced by using a multi-domain technique in which the tilt angle of the slit is separated into positive and negative domains. However, since it is difficult to generate an electric field in a desired direction at either end of the slit, the number of ends of slits increases if slits that extend in different directions are provided. Therefore, the aperture ratio decreases. Accordingly, Japanese Unexamined Patent Application Publication No. 2007-264231 describes a liquid crystal display panel in which multiple domains are realized by connecting slits extending in different directions. Thus, a large aperture ratio is provided.

SUMMARY

If two slits extending in different directions are formed in the above-described manner, domains having different alignment directions of the liquid crystal molecules are formed on both slit sides. Accordingly, a high aperture ratio and a wide viewing angle can be advantageously realized. However, when two slits that extend in different directions are connected in a chevron shape, the boundary of domains having different alignment directions moves back and forth. Therefore, alignment defects (ripples) occur. In particular, a ripple occurring when the surface of a liquid crystal display panel is pressed does not disappear, which is problematic.

Accordingly, the present embodiments provide an FFS mode liquid crystal display panel that has a slit formed by connecting two slits extending in different directions and that easily attenuates a ripple occurring when the surface of the liquid crystal display panel is pressed.

According to an embodiment, a liquid crystal display panel includes a pair of substrates facing each other with a liquid crystal layer therebetween, where one of the substrates has, thereon, an upper electrode having a plurality of slits formed therein, a lower electrode facing the upper electrode with an insulating film therebetween and disposed so as to be adjacent to the substrate, and an alignment film formed so as to cover surfaces of the upper electrode and the insulating film. Each of the slits includes a linear portion disposed so as to be parallel to a liquid crystal alignment direction when no voltage is applied and two extension portions extending from both ends of the linear portion so that a distance between the two extension portions increases in a direction perpendicular to the linear portion while keeping a symmetrical shape with respect to the direction.

According to the embodiment, the liquid crystal display panel includes the upper electrode having a plurality of slits formed therein, the lower electrode facing the upper electrode with an insulating film therebetween and disposed so as to be adjacent to the substrate, and an alignment film formed so as to cover surfaces of the upper electrode and the insulating film. Such a structure allows the liquid crystal display panel according to the embodiment to operate in an FFS mode. Note that an inorganic insulating film, such as a silicon oxide film or a silicon nitride film, can be used as the insulating film. In addition, a transparent conductive material, such as ITO (Indium Tin Oxide) or IZO (Indium Zinc Oxide), can be used for the upper electrode and the lower electrode. Furthermore, each of the upper electrode and the lower electrode can operate as a pixel electrode or a common electrode.

In addition, in the liquid crystal display panel according to the embodiment, each of the slits includes a linear portion disposed so as to be parallel to a liquid crystal alignment direction when no voltage is applied and two extension portions extending from both ends of the linear portion so that a distance between the two extension portions increases in a direction perpendicular to the linear portion while keeping a symmetrical shape with respect to the direction. Such a shape of the slit provides a state as if a linear portion were formed in the bending portion of the chevron shape. The linear portion is located so as to be parallel to the liquid crystal alignment direction when no voltage is applied. Note that when an alignment layer is subjected to a rubbing process, the liquid crystal alignment direction is the same as the rubbing direction.

Different domains in which the alignment directions of the liquid crystal molecules differs from each other are generated in the linear portion and each of the extension portions of the slit. Since a change in the electric field occurs in plan view, it is difficult for the boundary of domains having different alignment directions to move back and forth. However, if the linear portion of the slit is disposed parallel to the liquid crystal alignment direction when no voltage is applied, an angle formed by the liquid crystal alignment direction when no voltage is applied and the direction of the electric field is close to 90°. Thus, the rotational force exerted on the liquid crystal molecules is small. In contrast, in the extension portions, an angle formed by the liquid crystal direction when no voltage is applied and the direction of the electric field is small. Accordingly, the rotational force exerted on the liquid crystal molecules becomes larger. Consequently, according to the liquid crystal display panel of the embodiment, when the surface of the liquid crystal display panel is pressed and if the rotation angle of the liquid crystal molecules is changed and, therefore, a ripple occurs, the liquid crystal molecules in the extension portions of the slit easily return to an original state since the rotational force exerted on the liquid crystal molecules in the extension portions is large.

Furthermore, in the liquid crystal display panel according to the embodiment, the extension portions of the slit extend from both ends of the linear portion so that the distance between the two extension portions increases in a direction perpendicular to the linear portion while keeping a symmetrical shape with respect to the direction. If two slit portions that extend in different directions are formed in this manner, domains in which the alignment directions of the liquid crystal molecules differ from each other are formed in the slit portions. Thus, a wide viewing angle can be provided.

Still furthermore, in the liquid crystal display panel according to the embodiment, the light transmittance varies in accordance with a change in the birefringence of liquid crystal due to a change in a driving voltage. Such characteristic is referred to as a "voltage-transmittance (VT) characteristic". Such a change in the light transmittance of the liquid crystal display panel caused by a change in the driving voltage varies in accordance with the wavelength of the light. Thus, a problem called a color shift arises. In addition, in an FFS mode liquid crystal display panel, the VT characteristic varies in accordance with an angle formed by the length direction of the slit of the upper electrode and the liquid crystal alignment direction when no voltage is applied.

In the liquid crystal display panel according to the embodiment, an angle formed by the linear portion of the slit of the upper electrode and the liquid crystal alignment direction when no voltage is applied differs from that formed by each of the extension portions and the liquid crystal alignment direction. Since the angle formed by the linear portion of the slit of the upper electrode and the liquid crystal alignment direction when no voltage is applied differs from that formed by each of the extension portions and the liquid crystal alignment direction, the VT characteristic of the linear portion differs from that of each of the extension portions. If the slit of the upper electrode has a plurality of VT characteristics, the plurality of characteristics are superimposed. Thus, the slit of the upper electrode has a VT characteristic indicated by the envelope curve of the plurality of characteristics. Therefore, according to the embodiment, the liquid crystal display panel having an excellent viewing angle characteristic and negligible color shift can be achieved.

In addition, in the liquid crystal display panel according to the embodiment, it is desirable that the length of the linear portion of each of the slits range inclusively from 5 µm to 10 µm and the length of each of the extension portions be greater than the length of the linear portion.

In such a liquid crystal display panel, domains in which the alignment directions of the liquid crystal molecules differ from each other are formed in the linear portion and each of the extension portions of the slit. In the linear portion of the slit, a ripple occurring when the surface of the liquid crystal display panel is pressed easily disappears. However, this feature is not directly useful for improving the viewing angle characteristic. Accordingly, it is desirable that the length of the linear portion be smaller than the length of each of the extension portions. If the length of the linear portion of the slit formed in the upper electrode is less than 5 µm, a state the same as a state in which the linear portion of the slit is not present occurs. Thus, a problem of the boundary of domains having different liquid crystal alignment directions easily moving back and forth arises. In contrast, if the length of the linear portion of the slit is greater than 10 µm, the size of a sub-pixel becomes too small. Thus, it is difficult to set the length of each of the extension portions to a value larger than the length of the linear portion. Therefore, the advantage of improving the viewing angle characteristic disappears.

In addition, in the liquid crystal display panel according to the embodiment, an angle of an acute angle section formed by the linear portion and the extension portion of the slit range inclusively from 15° to 25°.

If the angle of the acute angle section formed by the linear portion and each of the extension portions of the slit is less than 15°, all of the slits are substantially linear. Therefore, the advantage of improving the viewing angle characteristic disappears. In contrast, if the angle of the acute angle section formed by the linear portion and each of the extension portions of the slit is greater than 25°, the boundary of the domains having different liquid crystal alignment directions becomes noticeable, although the viewing angle characteristic is improved. Thus, the quality of a displayed image is degraded. Accordingly, in the liquid crystal display panel of the embodiment, by setting the angle of the acute angle section formed by the linear portion and each of the extension portions of the slit to a value between 15° to 25°, the liquid crystal display panel having an excellent viewing angle characteristic and an excellent quality of a displayed image can be achieved.

In addition, in the liquid crystal display panel according to the embodiment, it is desirable that the liquid crystal alignment direction when no voltage is applied be the same as a direction in which a signal line formed in the liquid crystal display panel extends.

In general, in liquid crystal display panels for color display, each of the sub-pixels has a vertically long rectangular shape. In FFS mode liquid crystal display panels, since it is difficult to generate an electric field in a desired direction at both ends of the slit formed in the upper electrode, the aperture ratio decreases if the number of ends of the slits. In such liquid crystal display panels, the liquid crystal alignment direction when no voltage is applied is the same as a direction in which a signal line formed in the liquid crystal display panel extends. In addition, the linear portion of the slit is disposed parallel to the liquid crystal alignment direction when no voltage is applied. Accordingly, in such a liquid crystal display panel, the area of the closed end portion of the slit in which an image is not normally displayed can be reduced, and the slit can be formed efficiently in terms of area in the upper electrode. Thus, a liquid crystal display panel having a high aperture ratio and capable of displaying a bright image can be achieved.

In addition, in the liquid crystal display panel according to the embodiment, it is desirable that the lower electrode be formed on a surface of an interlayer film formed on the one of the substrates.

If the lower electrode is formed on a surface of the interlayer film formed on the substrate, the lower electrode, the insulating film, and the upper electrode that form the FFS mode liquid crystal display panel are all disposed on the interlayer film. Therefore, according to the liquid crystal display panel of the embodiment, the upper electrode and the lower electrode can be disposed over a large area of each pixel region. Thus, an FFS mode liquid crystal display panel having a high aperture ratio and capable of displaying a bright image can be achieved. In order to form the interlayer film, an appropriate photosensitive or non-photosensitive resin material having excellent transparency and electrical insulation performance can be selected and used.

Additional features and advantages are described herein, and will be apparent from the following Detailed Description and the figures.

BRIEF DESCRIPTION OF THE FIGURES

FIG. 5 is a plan view of a sub-pixel of a liquid crystal display panel according to a second embodiment.

DETAILED DESCRIPTION

Figure 1:
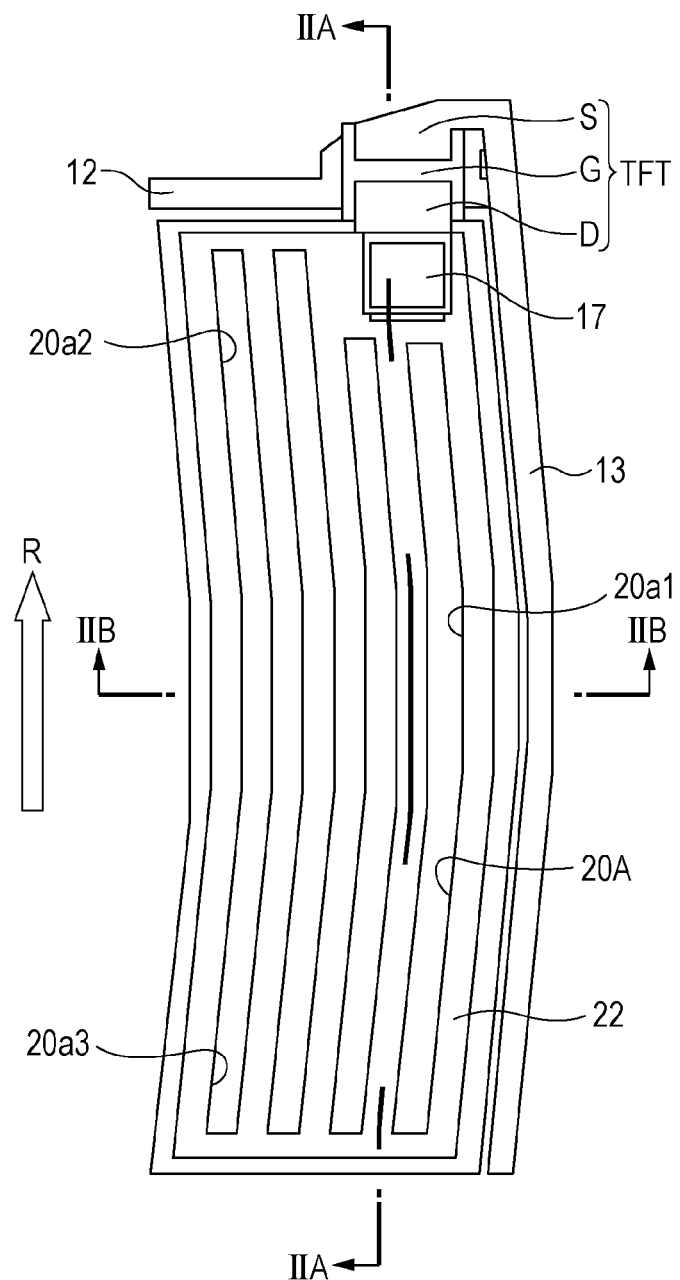
FIG. 1 is a plan view of a sub-pixel of an FFS mode liquid crystal display panel according to a first embodiment.

Embodiments are described below with reference to the accompanying drawings. In the drawings used herein, the scales of the layers and the components are appropriately altered from the actual ones for enabling them to be easily viewed.

Figure 2A:
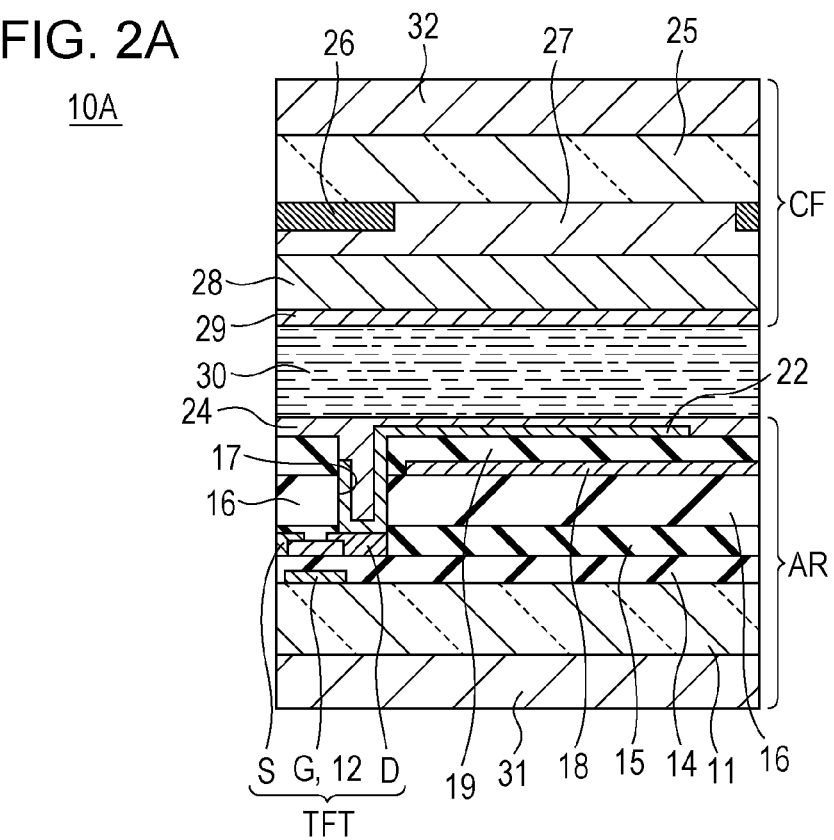
FIG. 2A is a cross-sectional view taken along a line IIA-IIA in FIG. 1.
Figure 2B:
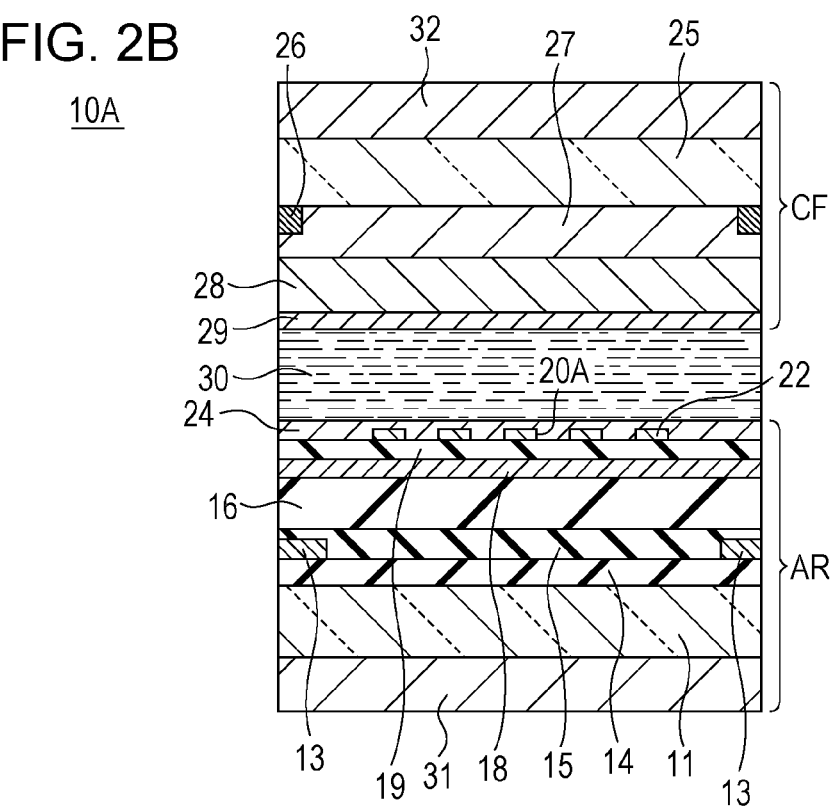
FIG. 2B is a cross-sectional view taken along a line IIB-IIB in FIG. 1.
Figure 3:
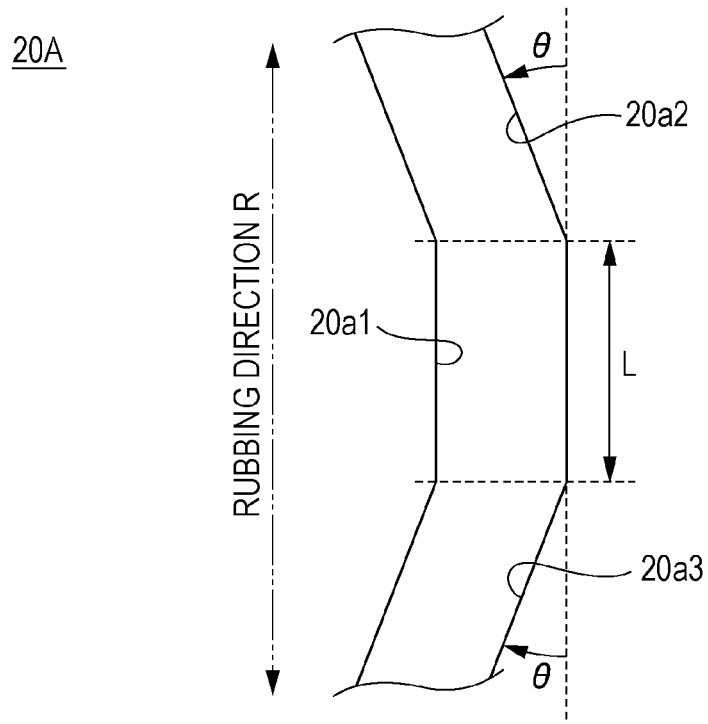
FIG. 3 is a schematic illustration of a relationship among the shapes of components of a slit shown in FIG. 1.
Figure 4:
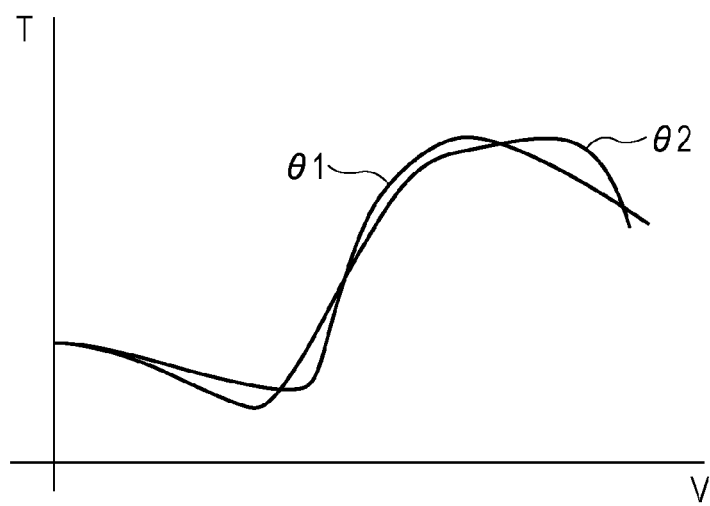
FIG. 4 is a graph illustrating a relationship between an angle formed by the slit and a liquid crystal alignment direction when no voltage is applied and a VT characteristic.

FIG. 1 is a plan view of a sub-pixel of an FFS mode liquid crystal display panel according to a first embodiment. FIG. 2A is a cross-sectional view taken along a line IIA-IIA in FIG. 1. FIG. 2B is a cross-sectional view taken along a line IIB-IIB in FIG. 1. FIG. 3 is a schematic illustration of a relationship among the shapes of components of a slit shown in FIG. 1. FIG. 4 is a graph illustrating a relationship between an angle formed by the slit and a liquid crystal alignment direction when no voltage is applied and a VT characteristic. FIG. 5 is a plan view of a sub-pixel of a liquid crystal display panel according to a second embodiment.

First Embodiment

A liquid crystal display panel 10A according to a first embodiment is described next with reference to FIGS. 1 to 3. The liquid crystal display panel 10A includes an array substrate AR and a color filter substrate CF. In the array substrate AR, a plurality of scanning lines 12 and a plurality of signal lines 13 are formed on the surface of a display area of a first transparent substrate 11 (e.g., a glass substrate) so as to intersect one another in a matrix while being electrically insulated by a gate insulator 14. In addition, a common line (not shown) is formed in the peripheral portion of the display area. Each area surrounded by the scanning lines 12 and the signal lines 13 serves as a sub-pixel. Furthermore, for example, a thin-film transistor (TFT) serving as a switching element is formed for each pixel of the first transparent substrate 11. The entirety of the surface of the first transparent substrate 11 including the TFTs is covered by a passivation film 15 formed from a silicon nitride film or a silicon oxide film.

In addition, an interlayer film 16 made of an organic material is formed over a surface of the passivation film 15. A contact hole 17 is formed in the interlayer film 16 and the passivation film 15 at a position corresponding to a drain electrode D of each of the TFTs. Furthermore, the surface of the interlayer film 16 excluding the area in which the TFTs and the contact hole 17 are formed has a lower electrode 18 thereon. The lower electrode 18 is made of a transparent conductive material, such as ITO or IZO. The lower electrode 18 is connected to a common line in the peripheral portion of a display area (not shown). Thus, the lower electrode 18 serves as a common electrode.

An insulating film 19 made from a silicon nitride film or a silicon oxide film is formed so as to cover the entirety of the surface of the first transparent substrate 11 having the lower electrode 18 thereon. The surface of the insulating film 19 has an upper electrode 22 formed thereon. The upper electrode 22 made of a transparent conductive material, such as ITO or IZO, is formed for each of the sub-pixels. The upper electrode 22 has a slit 20A of a predetermined shape formed therein. The slit 20A is described in more detail below.

The upper electrode 22 is electrically connected to a drain electrode D of the TFT via the contact hole 17. The upper electrode 22 serves as a pixel electrode. Note that which one of the upper electrode 22 and the lower electrode 18 is connected to the drain electrode D of the TFT and which one is electrically connected to the common line can be freely determined. In addition, a first alignment film 24 is formed so as to cover the entirety of the display area including the surface of the upper electrode 22 and the inner portion of the slit 20A. The first alignment film 24 is subjected to a rubbing process in order to align the liquid crystal molecules in a predetermined direction R. This rubbing process according to the present embodiment is an example of a process for determining a liquid crystal alignment direction when no voltage is applied.

As shown in FIGS. 2A and 2B, the color filter substrate CF includes a light shielding film 26 that is formed on a surface of a second transparent substrate 25 so as to cover the positions corresponding to the scanning lines 12, the signal lines 13, the contact hole 17, and the TFT of the array substrate AR. In addition, a color filter layer 27 of a predetermined color is formed on the surface of the second transparent substrate 25 surrounded by the light shielding film 26. Furthermore, an overcoat layer 28 is formed so as to cover the surfaces of the light shielding film 26 and the color filter layer 27. Also, a second alignment film 29 is formed on the surface of the overcoat layer 28. The second alignment film 29 is subjected to a rubbing process in a direction that is opposite to that of the first alignment film 24.

The array substrate AR and the color filter substrate CF are disposed so that the upper electrode 22 of the array substrate AR and the color filter layer 27 of the color filter substrate CF face each other. A liquid crystal 30 is sealed between the array substrate AR and the color filter substrate CF. In addition, a first polarization plate 31 and a backlight device (not shown) are disposed outside the array substrate AR. A second polarization plate 32 is disposed outside the color filter substrate CF. In this way, the liquid crystal display panel 10A according to the first embodiment is achieved.

The shapes of the components of one of the slits 20A of the liquid crystal display panel 10A according to the first embodiment are described next with reference to FIGS. 1 and 3. Each of the slits 20A has a linear portion 20a1 that extends parallel to the rubbing direction R of the first alignment film 24 and extension portions 20a2 and 20a3 that extend from both ends of the linear portion 20a1 so that a distance between the two extension portions 20a2 and 20a3 increases in a direction perpendicular to the linear portion while keeping a symmetrical shape with respect to the direction. That is, the slit 20A has the linear portion at a bending portion of a chevron shape. The linear portion is disposed so as to be parallel to the rubbing direction R of the first alignment film 24.

In an FFS mode liquid crystal display panel, the direction of an electric field occurring between an upper electrode and a lower electrode is normal to a side of a slit. Therefore, in the liquid crystal display panel 10A according to the first embodiment, domains in which the alignment directions of the liquid crystal molecules are different are formed in the linear portion 20a1 and the extension portions 20a2 and 20a3 of the slit 20A. However, since the direction of the electric field varies in plan view, the boundary of the domains having different alignment directions negligibly moves back and forth.

In addition, the linear portion 20a1 of the slit 20A is disposed so as to be parallel to the rubbing direction R. Accordingly, in the linear portion 20a1 of the slit 20A, an angle formed by the rubbing direction R and the direction of the electric field is close to 90°. Thus, the rotational force exerted on the liquid crystal molecules is small. In contrast, in the extension portions 20a2 and 20a3 of the slit 20A, the angle formed by the rubbing direction R and the direction of the electric field is less than 90°. Accordingly, the rotational force exerted on the liquid crystal molecules is larger than that applied to the liquid crystal molecules in the linear portion 20a1 of the slit 20A. Consequently, according to the liquid crystal display panel 10A of the first embodiment, even when the surface of the liquid crystal display panel 10A is pressed and if the rotation angle of the liquid crystal molecules is changed and, therefore, a ripple occurs, the surface of the liquid crystal display panel 10A easily changes back to an original state since the rotational force exerted on the liquid crystal molecules in the extension portions 20a2 and 20a3 of the slit 20A is large.

Furthermore, in the liquid crystal display panel 10A of the first embodiment, the extension portions 20a2 and 20a3 of the slit 20A of the upper electrode 22 extend from both ends of the linear portion 20a1 so that the distance between the two extension portions 20a2 and 20a3 increases in a direction perpendicular to the linear portion 20a1 while keeping a symmetrical shape with respect to the direction. If two slit portions that extend in different directions are formed in this manner, domains in which the alignment directions of the liquid crystal molecules differ from each other are formed in the slit portions. Thus, a wide viewing angle can be provided.

Still furthermore, in the liquid crystal display panel 10A of the first embodiment, an angle θ of an acute angle section formed by the linear portion 20a1 and each of the extension portions 20a2 and 20a3 of the slit 20A is set so that $15°≤θ≤25°$. In addition, a length L of the linear portion 20a1 of the slit 20A is set so that $5\ \mu m≤L≤15\ \mu m$. The length of each of the extension portions 20a2 and 20a3 is set so as to be longer than the length L of the linear portion 20a1.

If the angle of the acute angle section formed by the linear portion 20a1 and each of the extension portions 20a2 and 20a3 of the slit 20A is less than 15°, all of the slits are substantially linear. Therefore, the advantage of improving the viewing angle characteristic disappears. In contrast, if the angle of the acute angle section formed by the linear portion 20a1 and each of the extension portions 20a2 and 20a3 of the slit 20A is greater than 25°, the boundary of the domains having different liquid crystal alignment directions becomes visually noticeable, although the viewing angle characteristic becomes excellent. Thus, the quality of a displayed image is degraded. Accordingly, in the liquid crystal display panel 10A of the first embodiment, by setting the angle of the acute angle section formed by the linear portion 20a1 and each of the extension portions 20a2 and 20a3 of the slit 20A to a value between 15° to 25°, the liquid crystal display panel 10A having an excellent viewing angle characteristic and an excellent quality of a displayed image can be achieved.

In addition, in the liquid crystal display panel 10A of the first embodiment, although the linear portion 20a1 of the slit 20A can easily remove a ripple occurring when the surface of the liquid crystal display panel 10A is pressed, this feature is not directly useful for improving the viewing angle characteristic. Accordingly, it is desirable that the length of the linear portion 20a1 be smaller than the length of each of the extension portions 20a2 and 20a3. If the length of the linear portion 20a1 is less than 5 μm, a state the same as a state in which the linear portion 20a1 of the slit 20A is not present occurs. Thus, the boundary of domains having different liquid crystal alignment directions easily moves back and forth. In contrast, if the length of the linear portion 20a1 of the slit 20A is greater than 10 μm, the size of a sub-pixel becomes small. Accordingly, it is difficult to set the length of each of the extension portions 20a2 and 20a3 to a value larger than the length of the linear portion 20a1. Therefore, the advantage of improving the viewing angle characteristic disappears.

Furthermore, in general, a liquid crystal display panel has a voltage-transmittance (VT) characteristic. The light transmittance varies in accordance with a change in the birefringence of liquid crystal due to a change in a driving voltage. Such a change in light transmittance caused by a change in the driving voltage varies in accordance with the wavelength of the light. Thus, a problem called a color shift arises. In addition, in an FFS mode liquid crystal display panel, the VT characteristic varies in accordance with an angle formed by the length direction of the slit of the upper electrode and the rubbing direction. This relationship is shown in FIG. 4. That is, the curves θ1 and θ2 shown in FIG. 4 indicate the characteristics when angles formed by the length direction of the slit of the upper electrode and the rubbing direction are θ1 and θ2, respectively.

In the liquid crystal display panel 10A of the first embodiment, an angle formed by the linear portion 20a1 of the slit 20A of the upper electrode and the rubbing direction R differs from that formed by each of the extension portions 20a2 and 20a3 and the rubbing direction R. Accordingly, in the liquid crystal display panel 10A of the first embodiment, the VT characteristic of the linear portion 20a1 of the slit 20A differs from that of each of the extension portions 20a2 and 20a3. If the slit 20A of the upper electrode 22 has a plurality of VT characteristics, the plurality of characteristics are superimposed. Thus, the slit 20A of the upper electrode 22 has a VT characteristic indicated by the envelope curve of the plurality of characteristics. Therefore, according to the first embodiment, the liquid crystal display panel 10A having an excellent viewing angle characteristic and negligible color shift can be achieved.

Note that as described above, if two slits that extend in different directions are connected in a chevron shape, domains formed by two slits that extend in different directions in which the alignment directions of the liquid crystal molecules differ from each other can move back and forth. Accordingly, in an FFS mode liquid crystal display panel in which two slits that extend in different directions are connected into a chevron shape, a ripple defect in which when a thrust examination is performed, an abnormal alignment area remains in one side may occur. Even in the liquid crystal display panel 10A of the first embodiment, domains in which the alignment directions of the liquid crystal molecules differ from each other are generated in the linear portion 20a1 and each of the extension portions 20a2 and 20a3 of the slit 20A. However, in the liquid crystal display panel 10A of the first embodiment, the direction of an electrical field in the linear portion 20a1 of the slit 20A is changed from that in each of the extension portions 20a2 and 20a3 in plan view. Therefore, the boundary of the domains having different alignment directions negligibly moves back and forth.

In addition, in the liquid crystal display panel 10A of the first embodiment, the rubbing direction R is set to a direction along the signal lines 13 formed in the liquid crystal display panel 10A. In general, in color liquid crystal display panels, each sub-pixel has a vertically long rectangular shape. Therefore, in FFS mode liquid crystal display panels, it is difficult to generate an electric field in a desired direction at both ends of the slit formed in the upper electrode. Accordingly, if the number of ends of the slits is large, the aperture ratio decreases. To solve such problems, in the liquid crystal display panel 10A of the first embodiment, the rubbing direction R is set to a direction along the signal lines 13 formed in the liquid crystal display panel 10A. In addition, the linear portion 20a1 of the slit 20A is disposed parallel to the rubbing direction R. According to such a liquid crystal display panel 10A of the first embodiment, the area of the closed end portion of the slit 20A in which an image is not normally displayed can be reduced, and the slit 20A can be formed efficiently in terms of area in the upper electrode 22. Thus, a liquid crystal display panel having a high aperture ratio and capable of displaying a bright image can be achieved.

The first embodiment has been described with reference to the liquid crystal display panel 10A including the lower electrode 18 formed on a surface of the interlayer film 16. If the lower electrode 18 is formed on a surface of the interlayer film 16 in this manner, the lower electrode 18, the insulating film 19, and the upper electrode 22 that form the FFS mode liquid crystal display panel 10A are all disposed on the interlayer film 16. Therefore, according to the liquid crystal display panel 10A of the first embodiment, the upper electrode 22 and the lower electrode 18 can be disposed over a large area of a pixel region. Thus, the FFS mode liquid crystal display panel 10A having a high aperture ratio and capable of displaying a bright image can be achieved. In order to form the interlayer film 16, an appropriate photosensitive or non-photosensitive resin material having excellent transparency and electrical insulation performance can be selected and used.

Second Embodiment

The first embodiment has been described with reference to the liquid crystal display panel 10A in which the rubbing direction R is the same as a direction along the signal lines 13 formed in the liquid crystal display panel 10A. However, according to a second embodiment, a liquid crystal display panel in which the rubbing direction R is the same as a direction along the scanning lines 12 can provide the same advantages. FIG. 5 illustrates a liquid crystal display panel 10B according to the second embodiment. In the liquid crystal display panel 10B, a linear portion 20b1 of such a slit 20B extends along the scanning lines 12. In the liquid crystal display panel 10B according to the second embodiment, the slit 20B includes a linear portion 20b1 that extends parallel to the rubbing direction R and extension portions 20b2 and 20b3 that extend from both ends of the linear portion 20b1 so that a distance between the two extension portions 20b2 and 20b3 increases in a direction perpendicular to the linear portion while keeping a symmetrical shape with respect to the direction. Note that in the liquid crystal display panel 10B according to the second embodiment, only the structure of the slit 20B differs from that of the liquid crystal display panel 10A according to the first embodiment. The other components are similar to those of the liquid crystal display panel 10A. Therefore, the same numbering will be used in describing FIG. 5 as was utilized above in describing the liquid crystal display panel 10A, and detailed descriptions of the same components are not repeated. Even the liquid crystal display panel 10B according to the second embodiment can provide advantages that are substantially the same as those of the liquid crystal display panel 10A according to the first embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel comprising:
a plurality of scanning lines intersecting with a plurality of signal lines; and
a pair of substrates facing each other with a liquid crystal layer therebetween, one of the substrates having an upper electrode and a lower electrode thereon, the upper electrode having a plurality of slits formed therein, the lower electrode facing the upper electrode with an insulating film therebetween;
an electric field between the upper electrode and the lower electrode passing through the slits of the upper electrode in a transverse direction to be applied to the liquid crystal layer; and
an alignment film formed so as to cover surfaces of the upper electrode and the insulating film, wherein each of all of the slits include both a linear portion and two extension portions extending from both ends of the linear portion, wherein the linear portion extends parallel to a rubbing direction of the alignment film so that the linear portion is parallel to a liquid crystal alignment direction when no voltage is applied, wherein a distance between the two extension portions increases in a direction perpendicular to the linear portion while keeping a symmetrical shape with respect to the direction, wherein the linear portions of the slits are either parallel to or perpendicular to an extension direction of the scanning lines, and wherein an alignment direction of domains of liquid crystal molecules in the linear portion differs from an alignment direction of domains of liquid crystal molecules in each of the two extension portions.

2. The liquid crystal display panel according to claim 1, wherein a length of the linear portion of each of the slits ranges inclusively from 5 μm to 10 μm and wherein a length of each of the extension portions is greater than the length of the linear portion.

3. The liquid crystal display panel according to claim 1, wherein an angle of an acute angle section formed by the linear portion and the extension portion of the slit ranges inclusively from 15° to 25°.

4. The liquid crystal display panel according to claim 1, wherein the liquid crystal alignment direction when no voltage is applied is the same as a direction in which a signal line formed in the liquid crystal display panel extends.

5. The liquid crystal display panel according to claim 1, wherein the lower electrode is formed on a surface of an interlayer film formed on the one of the substrates.

6. The liquid crystal display panel according to claim 1, wherein the slits and the rubbing direction are configured such that a rotational force exerted on the liquid crystal molecules is larger in the extension portions than in the linear portion when a surface of the liquid crystal display panel is pressed and a rotation angle of the liquid crystal molecule is changed.

7. A liquid crystal display panel comprising:
a pair of substrates facing each other with a liquid crystal layer therebetween;
an upper electrode having a plurality of silts formed therein on one of the substrates;
a lower electrode facing the upper electrode with an insulating film therebetween;
an electric field between the upper electrode and the lower electrode passing through the slits of the upper electrode in a transverse direction to be applied to the liquid crystal layer;
an alignment film to cover surfaces of the upper electrode and the insulating film,
wherein each of all of the slits include both a linear portion and two extension portions extending from both ends of the linear portion,
wherein each of the two extension portions is formed symmetrical with respect to a perpendicular direction to an extending direction of the linear portion, wherein the linear portion extends parallel to a rubbing direction of the alignment film so that the linear portion is parallel to a liquid crystal alignment direction when no voltage is applied,
wherein an angle formed by the linear portion and each of the two extension portions is an acute angle, and
wherein an alignment direction of domains of liquid crystal molecules in the linear portion differs from an alignment direction of domains of liquid crystal molecules in each of the two extension portions.

8. The liquid crystal display panel according to claim 7, wherein the slits and the rubbing direction are configured such that a rotational force exerted on the liquid crystal molecules is larger in the extension portions than in the linear portion when a surface of the liquid crystal display panel is pressed and a rotation angle of the liquid crystal molecule is changed.

* * * * *